United States Patent
Lim et al.

(10) Patent No.: US 8,264,088 B2
(45) Date of Patent: Sep. 11, 2012

(54) PLANARIZED PASSIVATION LAYER FOR SEMICONDUCTOR DEVICES

(75) Inventors: Sin Leng Lim, Singapore (SG); In Ki Kim, Singapore (SG); Jong Sung Park, Singapore (SG); Min Hwan Kim, Singapore (SG); Wei Lu, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/179,573

(22) Filed: Jul. 11, 2011

(65) Prior Publication Data

US 2011/0266688 A1    Nov. 3, 2011

Related U.S. Application Data

(62) Division of application No. 12/062,534, filed on Apr. 4, 2008, now Pat. No. 7,998,831.

(60) Provisional application No. 60/909,943, filed on Apr. 4, 2007.

(51) Int. Cl.
*H01L 23/48* (2006.01)
*H01L 23/52* (2006.01)
*H01L 29/40* (2006.01)

(52) U.S. Cl. .............. 257/774; 257/E23.005; 438/424; 438/435; 438/697; 438/954

(58) Field of Classification Search .............. 438/424, 438/435, 697, 954; 257/774, E23.005
See application file for complete search history.

(56) References Cited

U.S. PATENT DOCUMENTS

| | | |
|---|---|---|
| 6,121,151 A | 9/2000 | Chen et al. |
| 6,252,999 B1 | 6/2001 | Haskell et al. |
| 6,303,043 B1 | 10/2001 | Chen et al. |
| 6,348,395 B1 | 2/2002 | Clevenger et al. |
| 6,421,108 B1 | 7/2002 | Chen et al. |
| 2008/0081411 A1 | 4/2008 | Cho et al. |

*Primary Examiner* — Jarrett Stark
*Assistant Examiner* — John M Parker
(74) *Attorney, Agent, or Firm* — Horizon IP Pte Ltd

(57) ABSTRACT

A semiconductor device includes a substrate having a dielectric layer and a device layer on the substrate. The device layer has an opening. First and second sublayers are disposed on the device layer and line the opening. The second sublayer serves as a stop layer for planarization to provide a substantially planarized top surface for the semiconductor device.

13 Claims, 22 Drawing Sheets

100

US 8,264,088 B2

PLANARIZED PASSIVATION LAYER FOR SEMICONDUCTOR DEVICES

CROSS REFERENCE TO RELATED APPLICATIONS

This application is a divisional application which claims benefit of co-pending U.S. patent application Ser. No. 12/062,534 filed on Apr. 4, 2008, which claims the benefit of U.S. Provisional Patent Application Ser. No. 60/909,943 filed on Apr. 4, 2007. The afore-mentioned applications are incorporated herewith by reference in their entirety.

FIELD OF THE INVENTION

The present invention relates generally to semiconductor devices and methods of fabrication thereof. More particularly, the present invention relates to planarized passivation layers for semiconductor devices.

BACKGROUND OF THE INVENTION

Liquid-crystal-on-silicon (LCOS) has gained considerable attention due to recent innovations in reflection projection technologies. FIG. 1 shows a cross-sectional view of a conventional LCOS structure 100. The LCOS structure comprises a substrate 105. Variety of devices such as transistors (not shown) can be formed on the substrate. A dielectric layer, for example, an intermetal dielectric (IMD) layer 120 is formed on top of the substrate. A patterned adhesive layer 130, such as Ti or TiN, and a patterned metal layer 160 are formed over the substrate. An opening, such as a recess or trench, is formed in the adhesive and metal layers, exposing portion of the IMD layer. A passivation oxide layer 170 and a passivation nitride layer 180 are deposited over the substrate and the opening. Non-planar passivation layers are thus formed. Liquid crystals (not shown) are then applied directly to the surface of the semiconductor device coated with metal layer and non-planar passivation layers. As such, high reflectance of the metal layer is compromised.

Flatness of the metal layer is one of the major factors affecting the reflectivity in LCOS devices. To obtain optimal performance, besides requiring high reflectivity of the metal layer, planarization of the passivation layers over the metal layer is important too.

From the foregoing discussion, it is desirable to provide planarized passivation layer for LCOS devices.

SUMMARY OF THE INVENTION

The present invention relates to planarized passivation layer for semiconductor devices. In one aspect of the invention, a semiconductor device is provided. The semiconductor device comprises a substrate having a dielectric layer and a device layer on the substrate. The device layer comprises an opening. The semiconductor device further includes first and second sublayers disposed on the device layer and lining the opening, the second sublayer is on top of the first sublayer. The second sublayer serves as a stop layer for planarization such that a substantially planarized top surface is obtained for the semiconductor device.

In another aspect of the invention, a method of fabricating a semiconductor device is presented. The method includes providing a substrate having a dielectric layer and a device layer formed thereon. The device layer is on top of the dielectric layer. An opening is formed through the device layer. The method further includes forming first and second sublayers on top of the device layer and lining the opening. A fill layer is deposited on top of the first and second sublayers and fills the opening. The fill layer is planarized until it reaches a top surface of the second sublayer, forming a substantially planarized top surface for the semiconductor device.

In another embodiment of the invention, a method of fabricating a semiconductor device comprises providing a substrate. The substrate includes a base substrate with a dielectric layer formed thereon, a device layer formed on top of the dielectric layer and first and second sublayers on top of the device layer. The method includes forming an opening through the second sublayer. A fill layer is provided on top of the second sublayer and fills the opening. The fill layer is planarized until it reaches a top surface of the second sublayer. The second sublayer serves as a stop layer such that a substantially planarized top surface is formed for the semiconductor device.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. Various embodiments of the present invention are described with reference to the following drawings, in which.

DETAILED DESCRIPTION OF THE INVENTION

The present invention relates to semiconductor devices. More particularly, the present invention relates to semiconductor devices with improved planar top surfaces.

Figure 1:
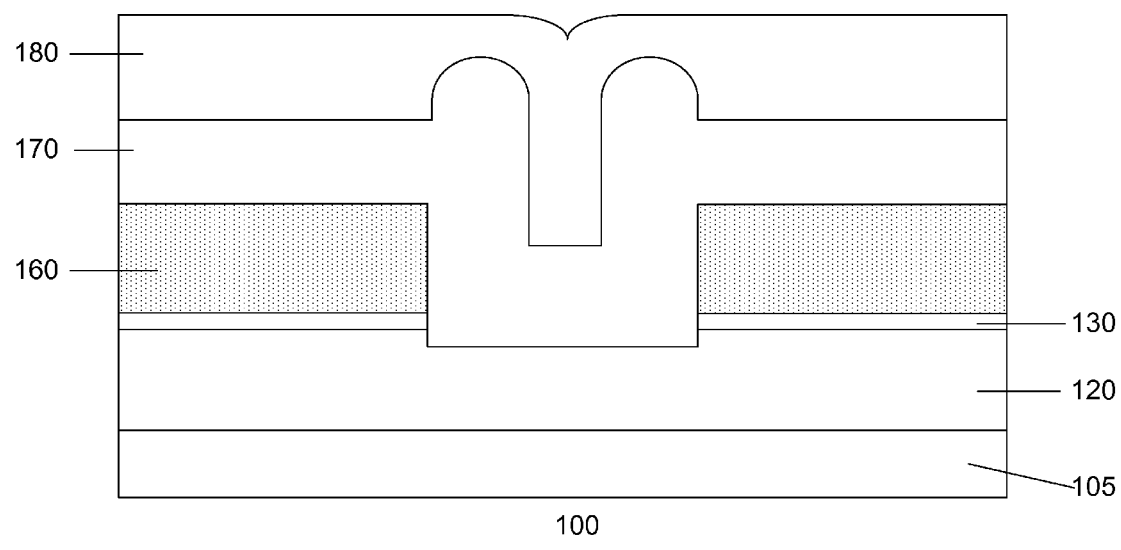
FIG. 1 shows a cross-section of a conventional LCOS device.
Figure 2:
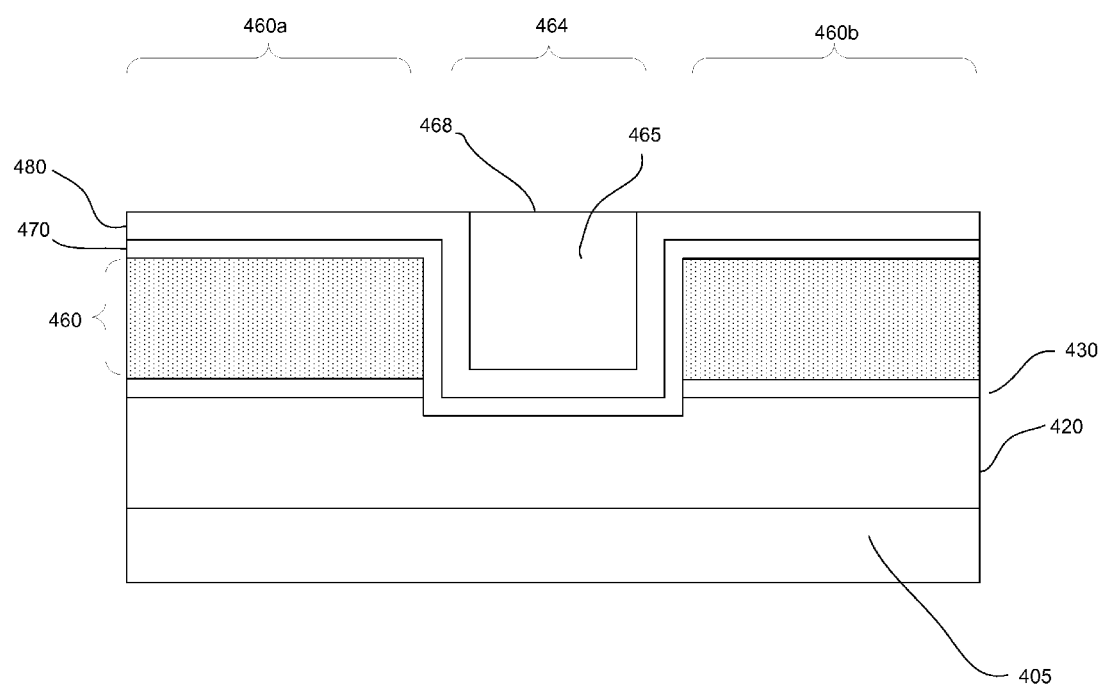
FIG. 2 illustrate a planarized passivation layer in a semiconductor structure in accordance with one embodiment of the invention.

FIG. 2 shows a cross-sectional view of a device structure in accordance with one embodiment of the invention. In one embodiment, the device structure comprises a LCOS device structure. Other types of devices may also be useful. As shown, the device includes a substrate 405. Typically, the substrate comprises a semiconductor material such as silicon. Other types of substrates, for example, SiGe, SiGeC or SiC, are also useful. Providing substrates which include an insulation or buffer layer, such as silicon-on-insulators (SOIs), SiGe-on-insulators (SGOIs), silicon-on-nothing (SON), is also useful.

Various circuit components (not shown), such as transistors, capacitors and/or resistors, can be provided on the substrate. Covering the components and substrate is a dielectric layer 420. The dielectric layer, for example, comprises silicon oxide. Other types of dielectric materials are also useful. The dielectric layer serves as, for example, an interlevel dielectric (ILD) layer. Typical thickness of the dielectric layer is about 500-20000 Å. Other thicknesses are also useful. It is further understood that there may be additional metal, intermetal dielectric and/or other device layers below the dielectric layer.

A device layer 460 is provided on the dielectric layer. In one embodiment, the device layer comprises a reflective layer formed from a first material. For example, the reflective layer comprises a conductive material, such as Al, AlCuSi or AlCu. Other types of reflective materials or device layers are also useful. A liner layer 430 can be optionally provided between the device layer and dielectric layer to promote adhesion. The liner layer can comprise, for example, Ti or TiN. Providing other types of liner materials can also be useful. The thickness of the liner layer is about less than 1000 Å. Providing liner layer with other thicknesses is also useful.

In one embodiment, the device layer comprises a patterned device layer having portions 460a-b separated by a space or trench 464. To ensure separation between the device layer portions, the trench comprises a depth which is greater than the bottom of the device and/or liner layer, which results in the dielectric layer being exposed. The trench, for example, is about less than 2000 Å below the bottom of the device and/or liner layer. Other depths are also useful.

In one embodiment, a passivation liner is disposed on the device layer. The passivation liner covers the top of the device layer and lines the trench. The passivation liner, in one embodiment, comprises a plurality of sublayers. As shown, the passivation liner layer comprises a dual passivation liner layer with first and second sublayers 470 and 480. Providing a passivation liner layer with other number of sublayers is also useful. The trench is filled with a second material 465.

In one embodiment, the second material comprises a dielectric material. Preferably, the second material comprises high density plasma (HDP) oxide. Other types of fill materials are also useful. A top surface 468 of the fill material and liner forms a planar or substantially planar surface. For example, the top surface of the fill material can be coplanar with or slightly below the liner surface. The top surface of the fill material, in one embodiment, is about less than 1000 Å below the liner surface.

The first sublayer, as shown, covers the device layer. The first sublayer serves as, for example, a passivation layer to protect the device layer from erosion by moisture in the air and to avoid scratch during processing. In one embodiment, the first sublayer comprises silicon oxide. The thickness of the first sublayer is, for example, about 50-2000 Å. Other thicknesses are also useful. As for the second sublayer, it comprises a material which the fill material can be removed selectively thereto. For example, the second sublayer serves as a polish stop for the fill material. In one embodiment, the second sublayer comprises silicon nitride. Other types of materials which can serve as a polish or etch stop are also useful. The second sublayer also protects the passivation layer, preventing it from being removed during processing. Additionally, the second sublayer protects the device layer from sputtering during filling of the trench. The thickness of the second sublayer is about 50-2000 Å. Preferably, the total thickness of the first and second sublayer is about 100-4000 Å.

Figure 3A:
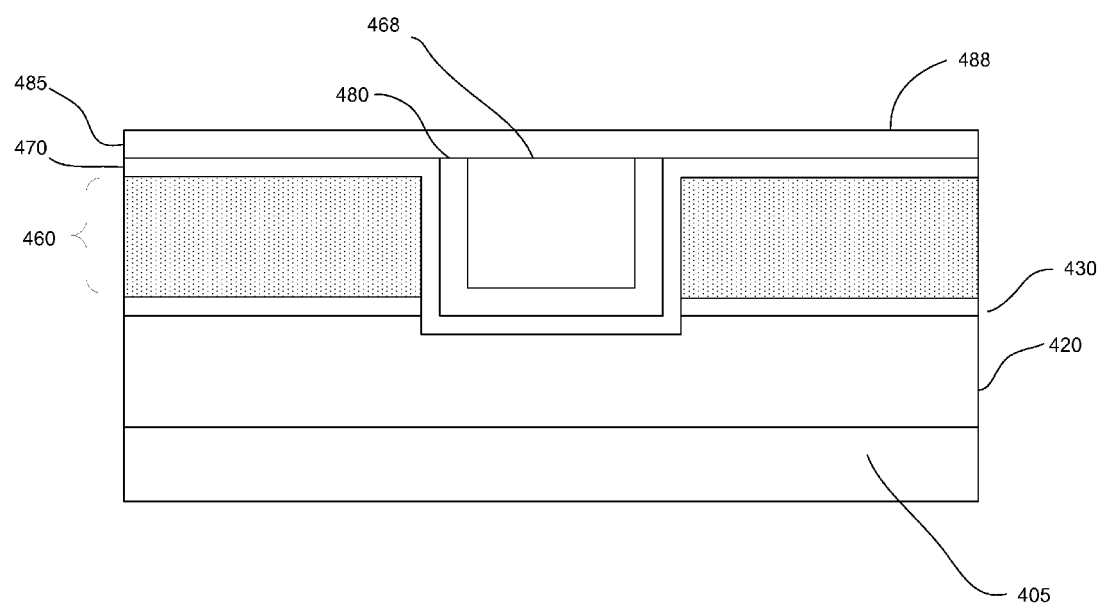
FIGS. 3a-b show a planarized passivation layer in a semiconductor structure in accordance with various embodiments of the invention.
Figure 3B:
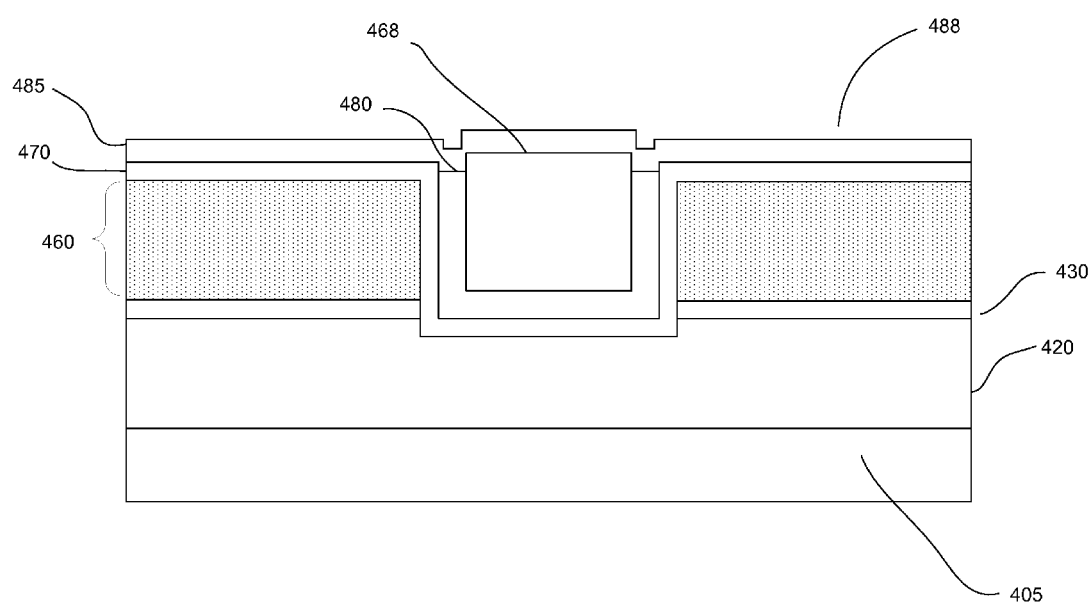

FIGS. 3a-b show alternative embodiments of the invention. As shown, the device structures are similar to that described in FIG. 2. In accordance with the embodiments shown, the second sublayer 480 serves as a sacrificial sublayer. The portions of the second sublayer over the device layer are removed, leaving portions lining the trench. Referring to FIG. 3a, the top surface 468 of the fill is coplanar with the top surface of the first sublayer. A surface passivation layer 485 is provided on the surface of the substrate, covering the first sublayer and trench fill. The surface passivation layer forms a planar top surface 488. In one embodiment, the surface passivation layer comprises silicon nitride. Other types of surface passivation materials are also useful. For example, silicon oxynitride can also be used as the surface passivation layer. The thickness of the surface passivation layer is about 50-2000 Å.

Referring to FIG. 3b, the top surface 468 of the trench fill is above the top surface of the first sublayer. Additionally, the second sublayer in the trench is recessed below the surface of the first sublayer and the top surface of trench fill. The recess, for example, is about less than 1000 Å. Like FIG. 3a, a surface passivation layer 485 is provided on the surface of the substrate, covering the first sublayer, recessed second sublayer and trench fill. The surface passivation layer, due to the recess and raised top surface, forms a substantially planar top surface 488. Providing surface passivation layer with more than one layer is also useful.

Figure 4A:
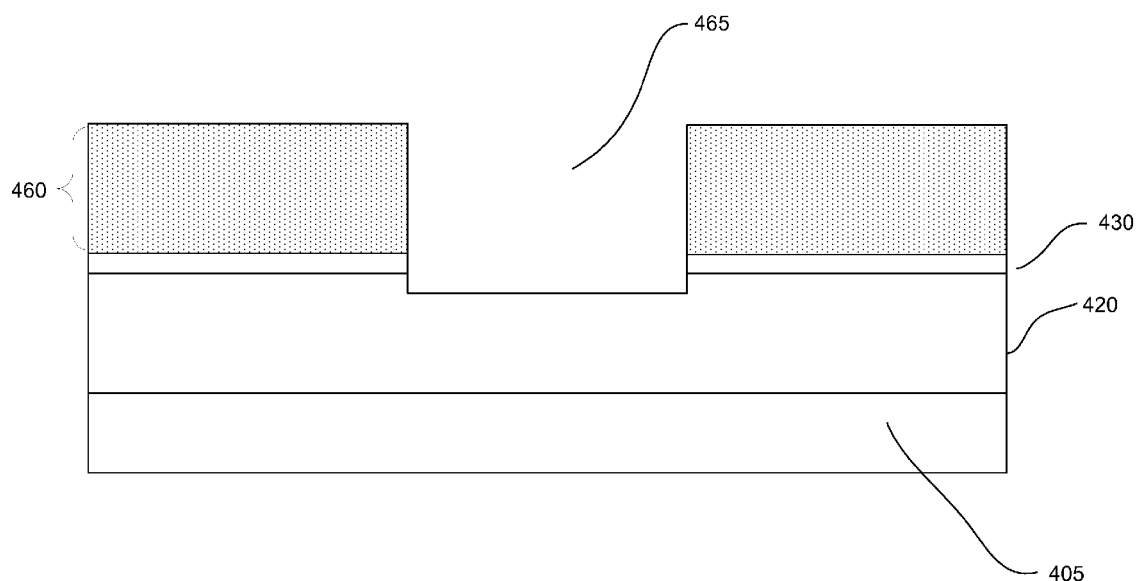
FIGS. 4a-e, 5a-b, 6a-f, 7a-c and 8a-b show process of forming a device structure with planarized passivation layer in accordance with various embodiments of the invention.

FIGS. 4a-e show a method of forming a device structure with planarized passivation layer in accordance with one embodiment of the invention. Referring to FIG. 4a, a substrate 405 is provided. In one embodiment, the substrate comprises silicon. Other types of semiconductor materials or substrates, for example, SiGe, SiGeC or SiC, are also useful. Providing substrates which include an insulation or buffer layer, such as silicon-on-insulators (SOIs), SiGe-on-insulators (SGOIs), silicon-on-nothing (SON), is also useful. The substrate, for example, can be prepared with various circuit components (not shown), such as transistors, capacitors and/or resistors. Other circuit components are also useful.

In one embodiment, a dielectric layer 420 is deposited on top of the substrate. The dielectric layer, for example, comprises silicon oxide. The dielectric layer serves as an inter-level dielectric (ILD) layer. Various techniques, such as chemical vapor deposition (CVD), can be used to deposit the dielectric layer. Typically, the dielectric layer is about 500-20,000 Å thick. Other deposition techniques, materials or thicknesses are also useful. It is understood that there may be additional metal, intermetal dielectric and/or other device layers below the dielectric layer.

Above the dielectric layer is formed a liner layer 430. The liner layer promotes adhesion between the dielectric layer and a subsequently formed layer above. In one embodiment, the liner layer comprises Ti or TiN. Typically, the liner layer is about less than 1000 Å. Conventional techniques, such as sputtering, can be used to form the liner layer. Other techniques, materials as well as thicknesses are also useful.

A device layer 460 is formed over the liner layer. In one embodiment, the device layer comprises a reflective layer. The reflective layer comprises, for example, a conductive layer such as Al, AlCuSi or AlCu. Other types of conductive materials are also useful. The device layer is typically about 100-20000 Å formed by sputtering or electroplating. Other techniques or thicknesses are also useful.

In one embodiment, the device and liner layers are patterned to form a trench opening 465. Conventional mask and etch techniques can be used to form the trench opening. For example, a photoresist mask layer is formed over the device layer and patterned to expose portions of the dielectric layer. An anisotropic etch, such as reactive ion etch (RIE) is performed to removed the device and liner layers. To ensure separation, an over etch can be performed, recessing the opening below the bottom of the liner layer.

Figure 4B:
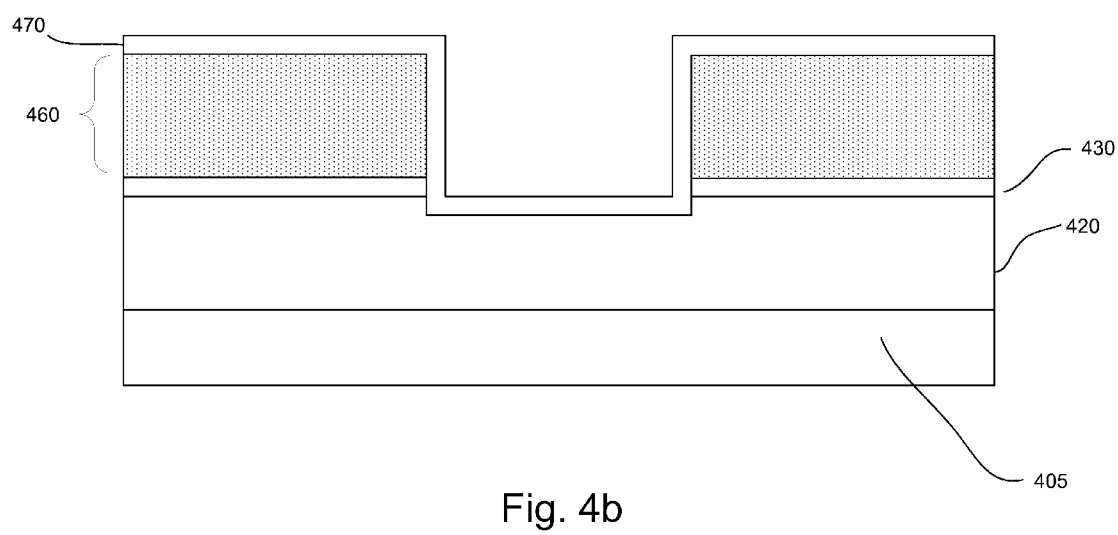

Referring to FIG. 4b, a first sublayer 470 of a passivation liner is formed on the substrate, covering the device layer and lining the trench opening. In one embodiment, the first sublayer comprises silicon oxide having a thickness of about 50-2000 Å. Other thicknesses are also useful. The first sublayer serves as a first passivation layer protecting the first material of the device layer from erosion due to environment and subsequent processing chemistry. In one embodiment, the first sublayer is formed by CVD. Forming the first sublayer using other techniques are also useful.

Figure 4C:
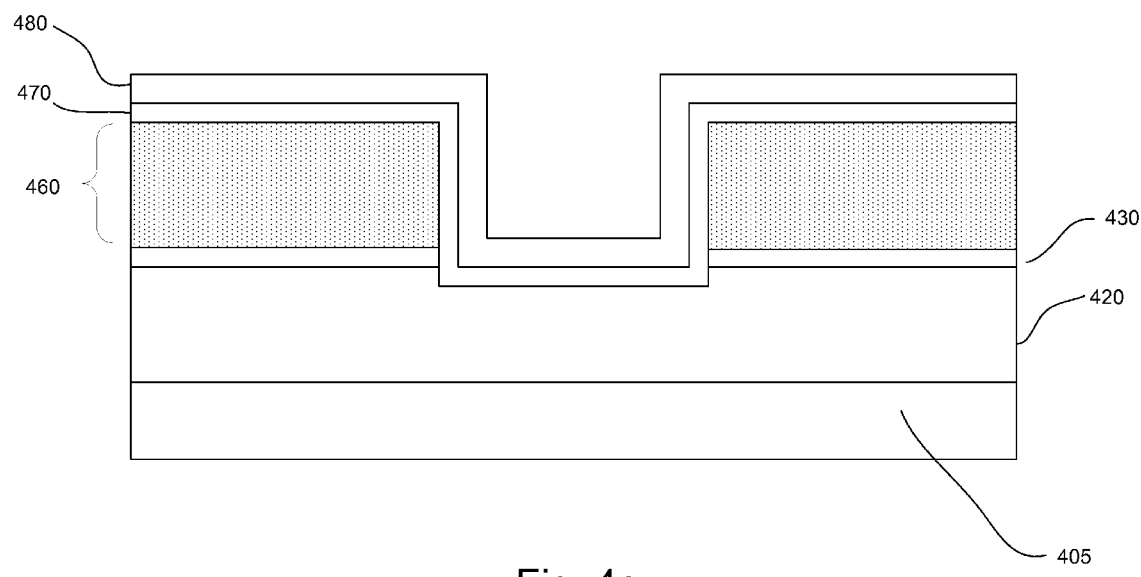

A second sublayer 480 of the passivation liner is deposited on the first sublayer, as shown in FIG. 4c. The second sublayer comprises a material different from the first sublayer as well as the material used to fill the trench opening. In one embodiment, the second sublayer has a higher etch rate, hardness and resistance relative to the first sublayer. The second sublayer, for example, comprises silicon nitride. The thickness of the second sublayer is about 50-2000 Å. Other thicknesses are also useful. The second sublayer serves as a stop layer for planarization. Various techniques, such as CVD, can be used to form the second sublayer.

Figure 4D:
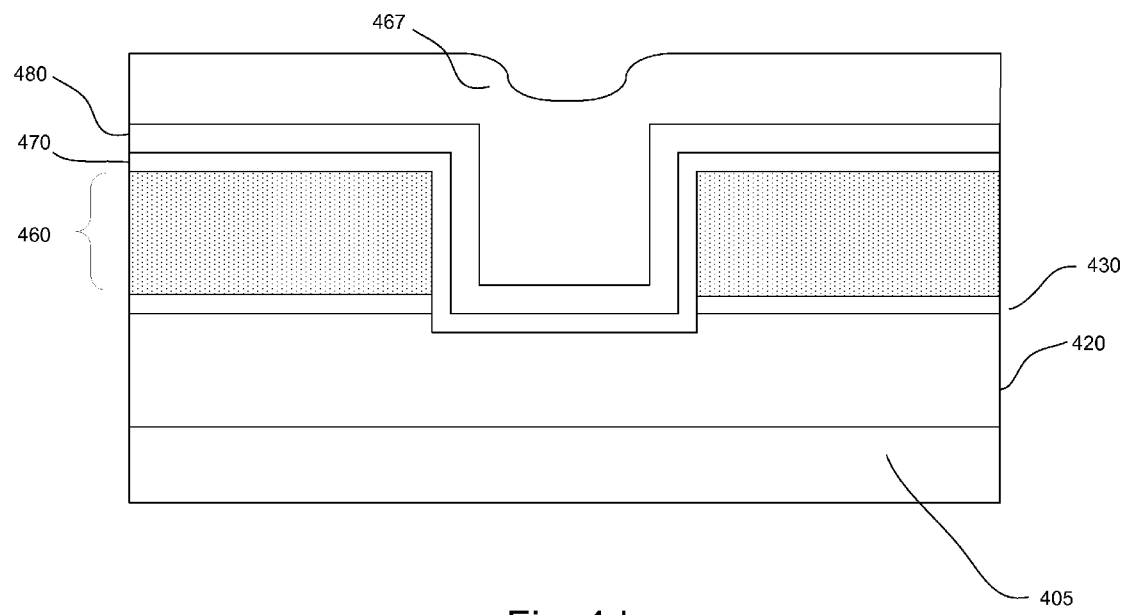

In FIG. 4d, a fill layer 467 is deposited over the surface of the second sublayer. The fill layer fills the trench and covers the surface of the second sublayer. In one embodiment, the fill layer should sufficiently fill the trench opening. The fill layer comprises a dielectric material which can be removed selective to the second sublayer. In one embodiment, the first sublayer and fill layer comprises the same material, such as silicon oxide. Providing the first sublayer and fill layer with different materials is also useful. Preferably, the fill layer comprises silicon oxide formed by HDP CVD. Other types of materials or deposition techniques are also useful.

Figure 4E:
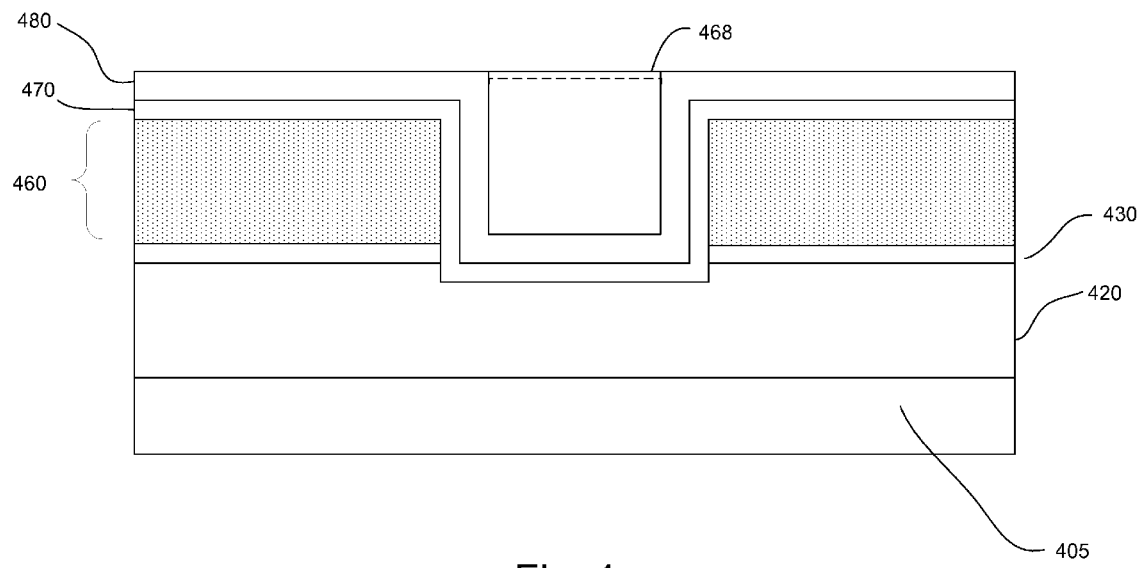

The substrate is polished to remove excess material of the fill layer, as shown in FIG. 4e. For example, the substrate is polished by chemical mechanical polishing (CMP). Preferably, the CMP employs a highly selective slurry or a combination of high and low selective slurry which removes excess fill material using the second sublayer as a polish stop. This reduces or minimizes loss of the second sublayer while removing the fill layer. The selectivity of the fill material to the second sublayer, in one embodiment, is about 1:2-1:1000. Other selectively ratios are also useful, depending on the wafer surface option ratio. The CMP stops on the second sublayer, forming a planar or substantially planar surface 468 between the top of the fill material in the trench and surface of the second sublayer. An over-polish can be performed to slightly recess the top surface of the fill layer in the trench, as indicated by the dotted line. The recess should be about less than 1000 Å.

The process continues by depositing liquid crystal materials on top of the second passivation and isolation layers (not shown). By not removing the second sublayer, it can also serve as a passivation layer. Additional passivation layers can also be formed on top of the second and isolation layers before the deposition of the liquid crystal material. A top substrate can be disposed on top of the liquid crystal layer.

Figure 5A:
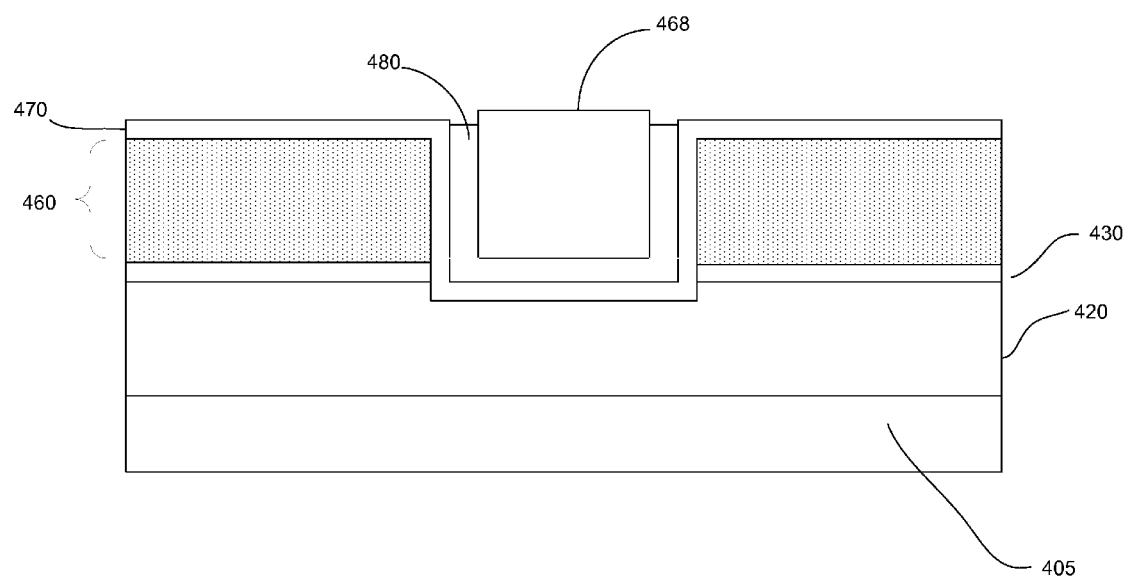
Figure 5B:
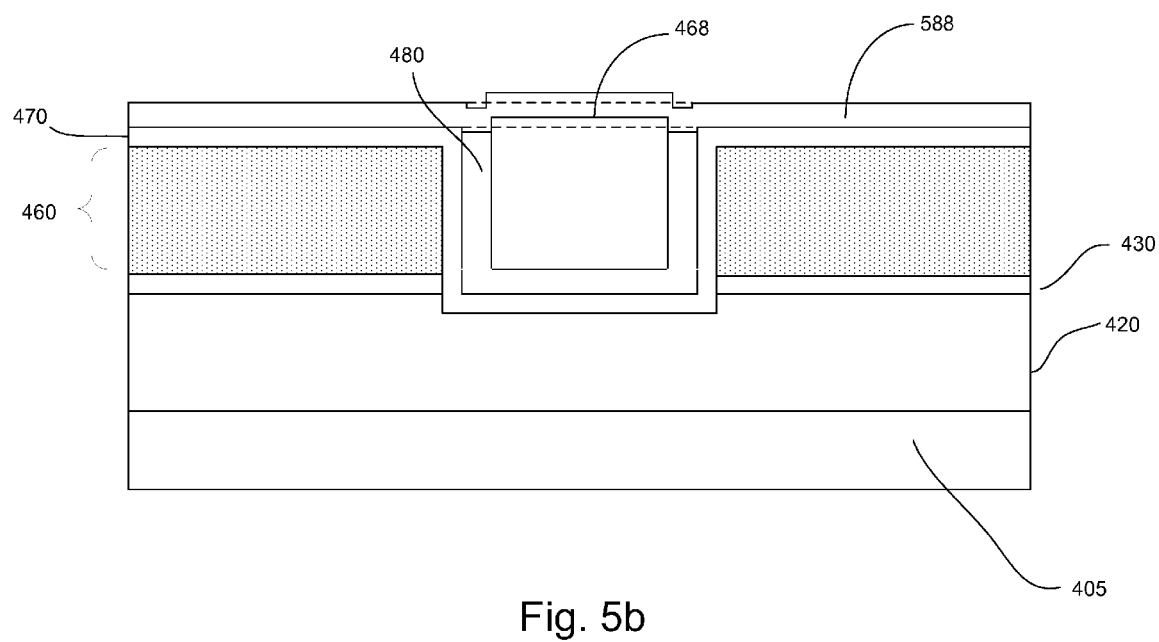

FIGS. 5a-b show a process of forming a device structure with planarized passivation layer in accordance with another embodiment of the invention. As shown, the process continues from FIG. 4e. Preferably, the top surface 468 of the fill layer in the trench is recessed to a level near to that of the top surface of the first sublayer. The recess is about less than 1000 Å. Illustratively, the top surface of the fill is above the top surface of the first sublayer.

In accordance with the one embodiment, the second sublayer serves as a sacrificial second sublayer wherein horizontal portions over the device layer are removed. Removal of the horizontal portions of the second sublayer can be achieved by, for example, an isotropic etch, such as a wet etch using chemistry which is selective to the first sublayer and fill layer. Alternatively, an anisotropic etch, such as dry etch can also be used. Other techniques are also useful. The etch, for example, employs chemistry which removes the second sublayer selective to the first sublayer. An overetch is performed which recesses the surface of the portion of the second sublayer lining the trench. This results in a substantially planar surface with elevations and recesses corresponding to the first and second sublayers and fill. In one embodiment, the total difference in height between the elevations and recesses is less than about 1000 Å.

Referring to FIG. 5b, a top layer 588, serving as a surface passivation layer, is deposited on the surface of the substrate, covering the first and second sublayers as well as the fill. The surface passivation layer, for example, comprises a transparent material, such as silicon nitride or silicon oxynitride. Typically, the surface passivation layer is deposited by CVD. Providing the surface passivation layer using other techniques as well as materials is also useful. In one embodiment, the thickness of the surface passivation layer is about 100-2000 Å. The surface passivation layer is substantially planar, tracking the topography of the surface below. Alternatively, the first and second sublayers and top of the fill are coplanar, resulting in a planar surface, as indicated by the dotted lines in FIG. 5b. Such configuration improves the passivation integrity of the semiconductor device.

Figure 6A:
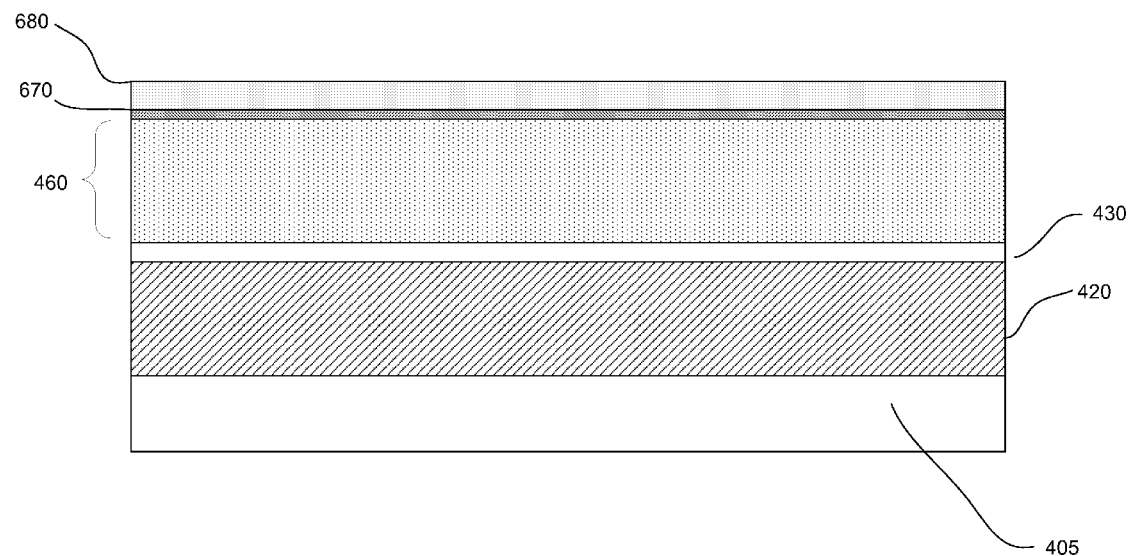

FIGS. 6a-f show a process of forming a device structure in accordance with an alternative embodiment of the invention. Referring to FIG. 6a, as in FIG. 4a, a substrate 405 is provided prepared with a dielectric layer 420, liner layer 430 and device layer 460. First and second sublayers 670 and 680 of a passivation liner are formed on the surface of the device layer. The first and second sublayers are similar to those described in FIG. 4a. For example, the first sublayer comprises silicon oxide and the second sublayer comprises silicon nitride. Typically, the first sublayer is about 50-2000 Å while the second sublayer is about 50-2000 Å. The first sublayer serves as a first passivation layer to prevent erosion of a device layer from external environment. The second sublayer serves as a stop layer for planarization. The thickness of the first and second sublayers, preferably, is about 100-4000 Å.

Figure 6B:
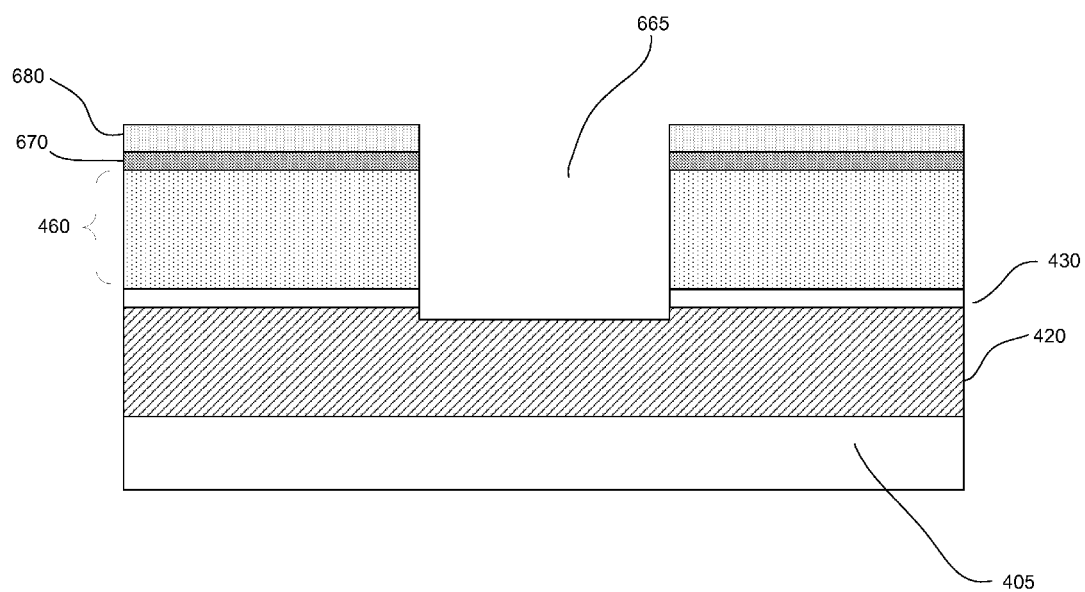

As shown in FIG. 6b, an opening or trench 665 is formed in the substrate. The opening, in one embodiment, is sufficiently deep to expose the dielectric layer beneath the liner layer, separating portions of the device layer. Various conventional techniques can be employed to form the opening. In one embodiment, the opening is formed using conventional patterning processes, such as masking and anisotropic etching.

Figure 6C:
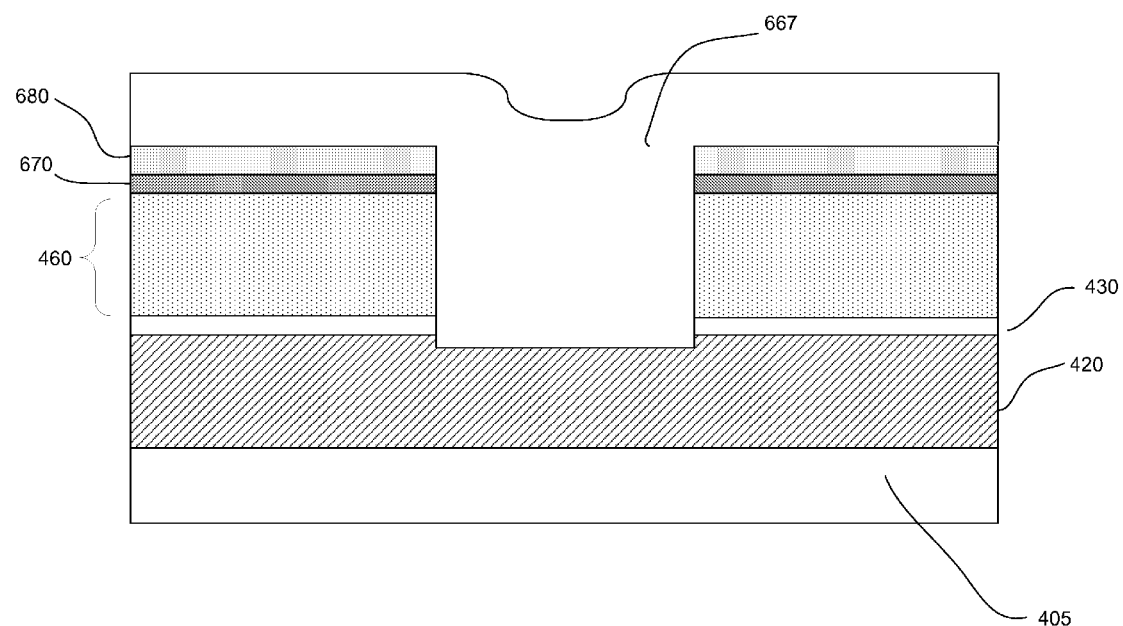

As shown in FIG. 6c, the process continues by depositing a fill layer 667 on the substrate. The fill layer, for example, is similar to the fill layer of FIG. 4d. The fill layer sufficiently fills the trench opening and covers the surface of the device layer. The fill layer, in one embodiment, comprises silicon oxide. Preferably, the fill layer is deposited by HDP CVD. Other techniques and materials are also useful.

Figure 6D:
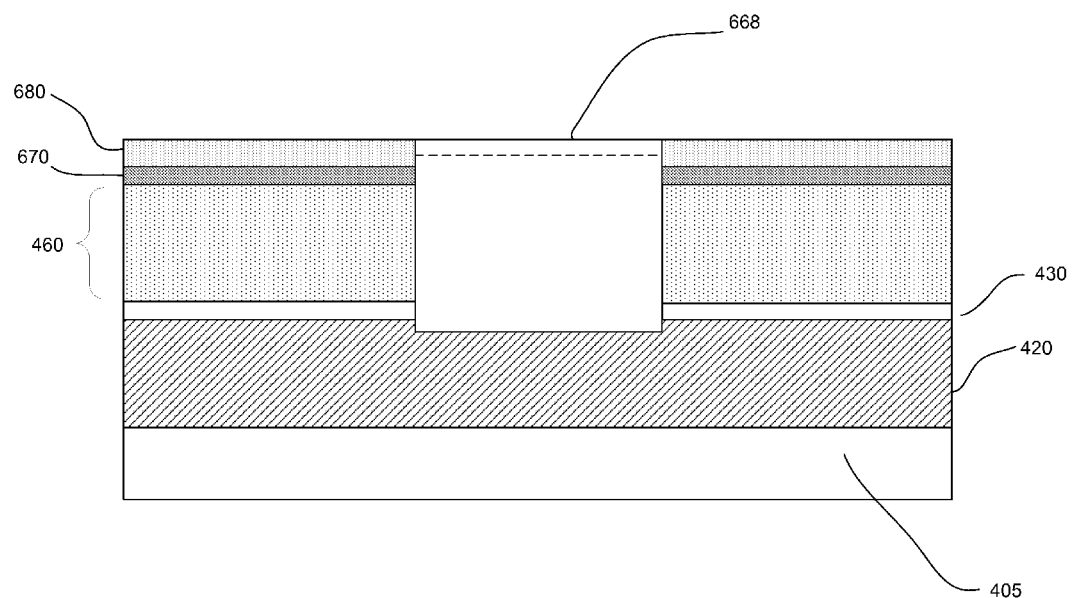

The surface of the substrate is polished, as shown in FIG. 6d. For example, a CMP is performed to remove excess materials of the fill layer. The CMP removes excess materials of the fill layer selective to the second sublayer. The CMP stops on the second sublayer, forming a planar or substantially planar surface 668 between the top of the fill material in the trench and surface of the second sublayer. For example, an over-polish can be performed to slightly recess the top surface of the fill layer in the trench, as indicated by the dotted line. The recess should be less than about 1000 Å.

Figure 6E:
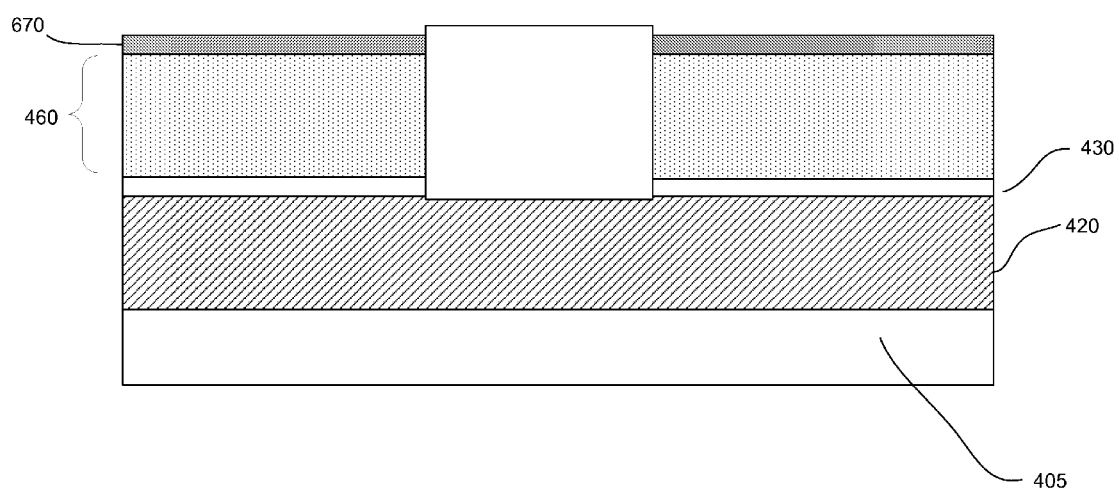
Figure 6F:
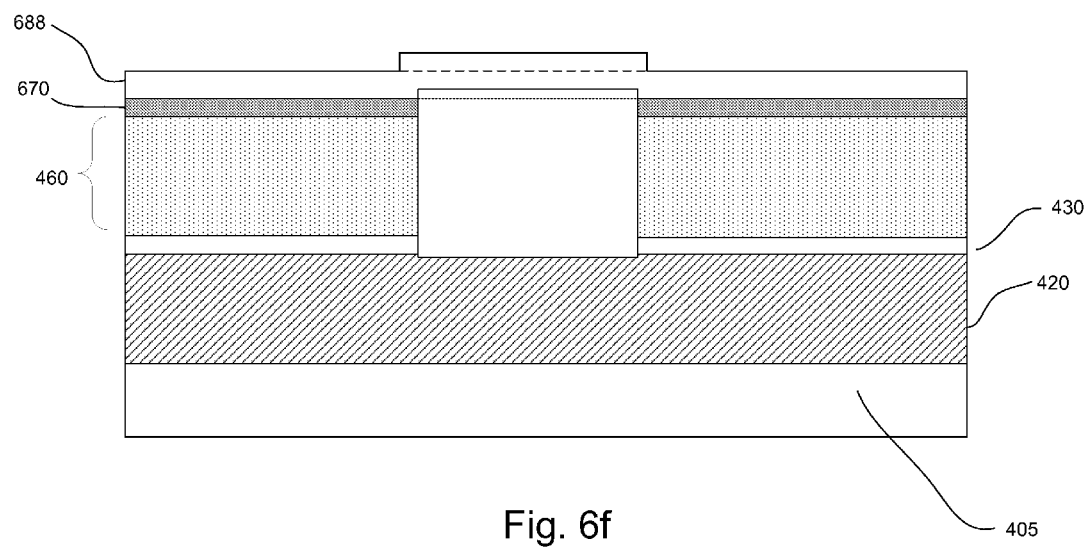

In FIG. 6e, the second sublayer which serves as a sacrificial second sublayer in this embodiment is removed, exposing top surface of the first sublayer. The removal of the second sublayer can be achieved by, for example, an isotropic etch, such as a wet etch. Alternatively, anisotropic etch, such as dry etch can also be used. Other techniques are also useful. The etch, for example, employs a chemistry which removes the second sublayer selective to the first sublayer and fill layer.

A surface passivation layer 688, is deposited on the surface of the substrate, covering the first sublayer and the fill layer in the trench. The surface passivation layer, for example, comprises a transparent material, such as silicon nitride or silicon oxynitride. In one embodiment, the thickness of the surface passivation layer is about 100-2000 Å. The surface passivation layer is substantially planar, tracking the topography of the surface below. Alternatively, the first sublayer and top of the fill are coplanar, resulting in a planar surface, as indicated by the dotted lines in FIG. 6f. Such configuration improves the passivation integrity of the semiconductor device.

Figure 7A:
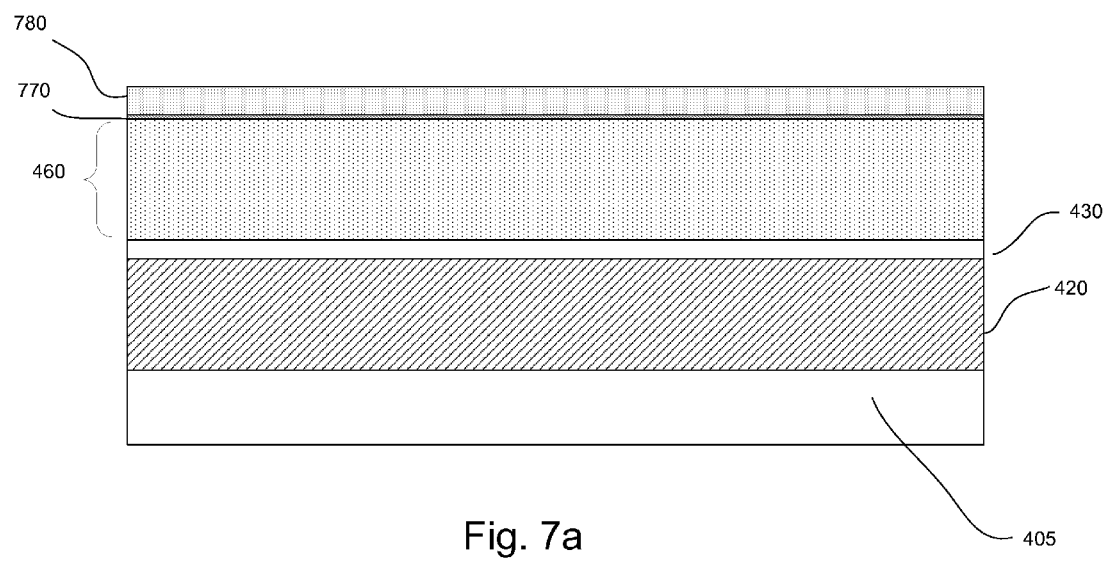
Figure 7B:
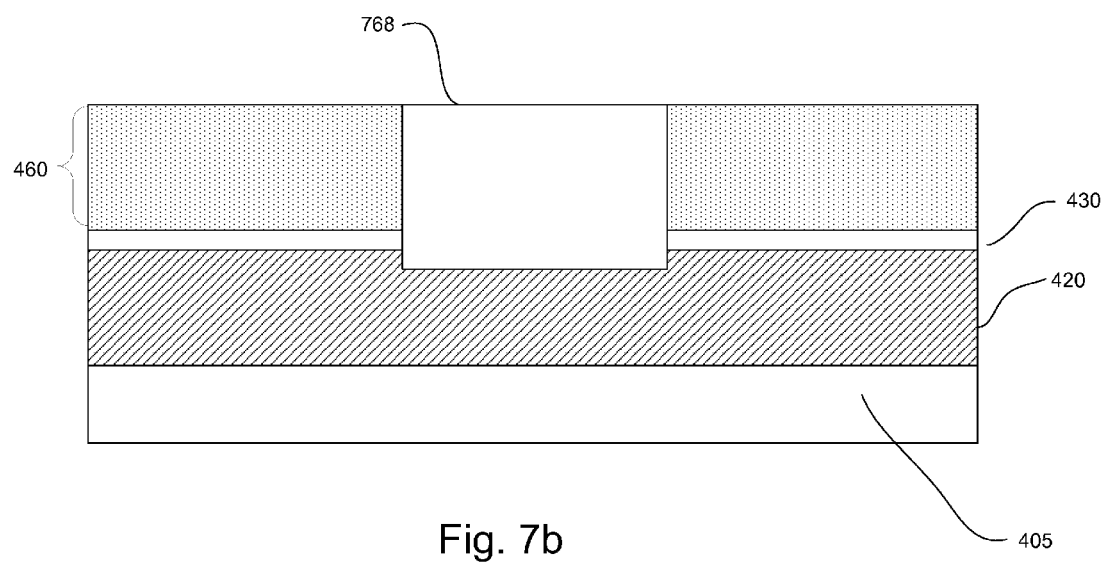
Figure 7C:
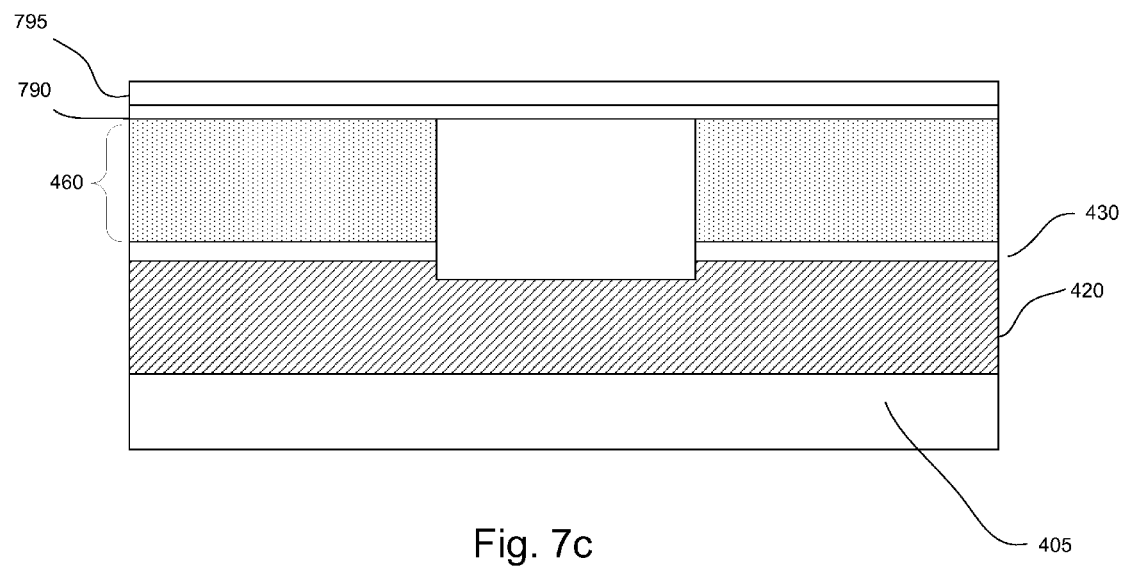

FIGS. 7a-c show a process of forming a device structure in accordance with another embodiment of the invention. Referring to FIG. 7a, the layers formed for the device structure are similar to those recited in FIG. 6a. The first 770 and second 780 sublayers, for example, comprises silicon oxide and silicon nitride respectively. In accordance with the current embodiment, the first sublayer is about 50-2000 Å while the second sublayer is about 50-2000 Å. The total thickness of the first and second sublayers, in one embodiment, is about 100-4000 Å. Preferably, the first sublayer is thinner than the second sublayer. Such configuration reduces the stress induced by the second sublayer.

The process continues as those described for FIGS. 6b-d. The second sublayer is removed, for example, by anisotropic etch, exposing top surface of the first sublayer and fill layer in the trench. In accordance with the current embodiment, the first sublayer and fill layer comprises the same material, such as silicon oxide. The first sublayer, in this embodiment, serves as a sacrificial first sublayer. As illustrated in FIG. 7b, a CMP is performed to remove the first sublayer and portion of the fill layer. The CMP removes the first and excess materials of the fill layer selective to the device layer. The CMP stops on the device layer, forming a planar or substantially planar surface 768 between the top of the fill material in the trench and surface of the device layer.

In one embodiment, a surface passivation liner is disposed on the substrate covering the device and fill layers as illustrated in FIG. 7c. The surface passivation liner, in one embodiment, comprises a plurality of sub-layers. As shown, the surface passivation liner comprises a dual passivation liner layer with first and second surface sublayers 790 and 795. Providing a surface passivation liner with other number of surface sublayers is also useful.

In one embodiment, the first surface sublayer comprises silicon oxide. The thickness of the first surface sublayer is typically about 50-2000 Å. Other thicknesses are also useful. As for the second surface sublayer, it comprises silicon nitride. Other types of materials are also useful. The first and second surface sublayers protect the device layer from erosion by moisture in the air and to avoid scratch during subsequent processing. The thickness of the second surface sublayer is about 50-2000 Å. The total thickness of the first and second surface sublayers is about 100-4000 Å.

Figure 8A:
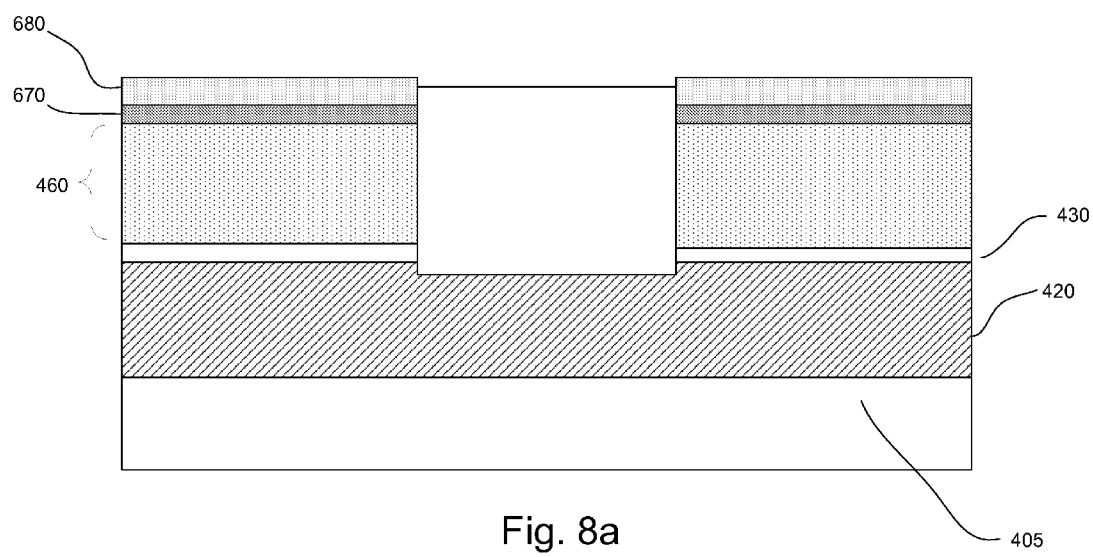
Figure 8B:
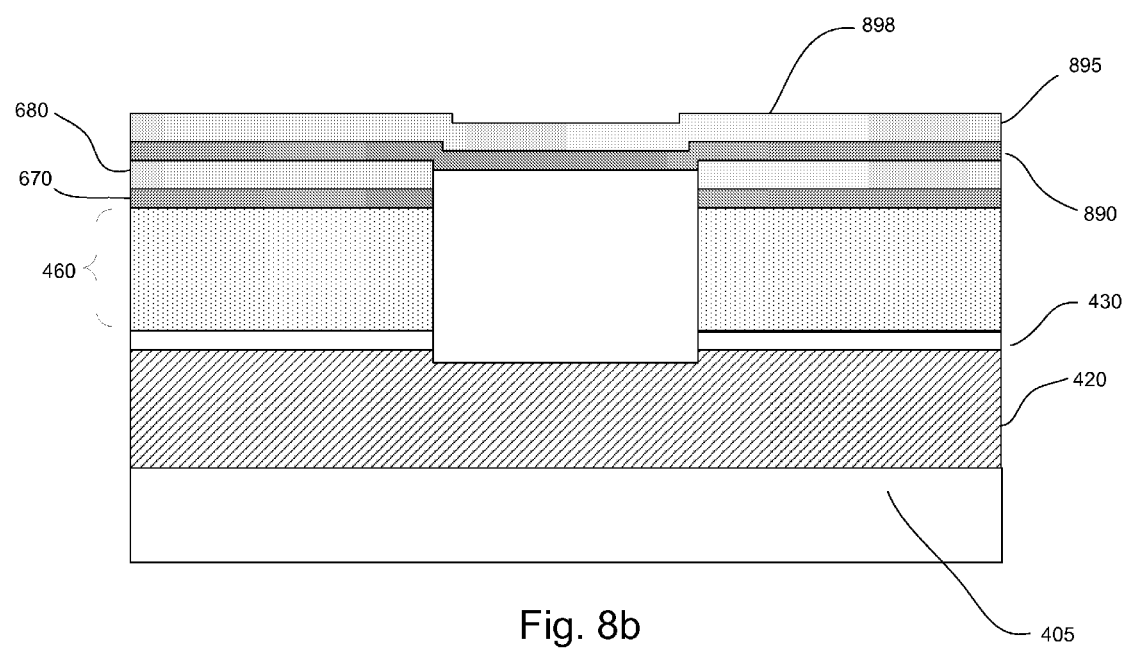

In an alternative embodiment, a method of forming a device structure with substantially planarized passivation layer is presented in FIGS. 8a-b. The process steps are similar to those described for FIGS. 6a-d. An over-polish can be performed to slightly recess the top surface of the fill layer in the trench. The recess should be less than about 1000 Å. A surface passivation liner that comprises a first 890 and second 895 surface sublayer is provided on the surface of the substrate, covering the second sublayer and the recessed trench fill. In one embodiment, the first surface sublayer comprises silicon oxide and the second surface sublayer comprises silicon nitride. Providing a surface passivation liner with other number of sublayers is also useful. The surface passivation liner, due to the recess and raised top surface, forms a substantially planar top surface 898. The first and second sublayers 670 and 680 which remain in the device structure provides additional passivation layers to the device structure. Thus, reflectance of the first material of the device layer is enhanced.

Although the passivation liner is described having a plurality of sublayers, it is also useful to provide the passivation liner with a single layer. The single layer, for example, can be an oxide or nitride layer. The thickness of the single layer, in accordance with one embodiment, is about 100-4000 Å. Such configuration improves passivation integrity and still provides a substantially planarized top surface for the semiconductor device.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A device comprising:
   a substrate with a device layer having a trench opening;
   a first sublayer over a top surface of the device layer;
   a fill layer to fill the opening, wherein a top surface of a fill material of the fill layer is substantially planar with a top surface of the first sublayer; and
   a second sublayer, wherein the second sublayer lines a bottom and sidewalls of the trench opening and the second sublayer in the trench is recessed below the top surface of the first sublayer and the top surface of the fill material.

2. The device of claim 1 further includes a surface passivation layer on the surface of the substrate, wherein the surface passivation layer covers the first sublayer, recessed second sublayer and the fill material.

3. The device of claim 1 wherein the first sublayer serves as a passivation layer to protect the device layer.

4. The device of claim 1 wherein the first second sublayer comprises nitride.

5. The device of claim 4 further includes a surface passivation layer on the surface of the substrate, wherein the surface passivation layer covers the first sublayer, recessed second sublayer and the fill material.

6. The device of claim 5 wherein the surface passivation layer includes a plurality of sublayers.

7. The device of claim 1 wherein the device layer comprises a reflective layer.

8. The device of claim 7 wherein the reflective layer comprises a conductive material.

9. The device of claim 1 wherein the first sublayer comprises oxide.

10. The device of claim 9 wherein the second sublayer comprises nitride.

11. The device of claim 9 further includes a surface passivation layer on the surface of the substrate, wherein the surface passivation layer covers the first sublayer, recessed second sublayer and the fill material.

12. The device of claim 11 wherein the surface passivation layer includes a plurality of sublayers.

13. The device of claim 11 wherein the surface passivation layer comprises silicon nitride or silicon oxynitride.

* * * * *